(No Model.) 2 Sheets—Sheet 1.

A. H. WRIGHT.
FILTER.

No. 559,249. Patented Apr. 28, 1896.

WITNESSES:
C. Neveux
Rev. G. Hosted

INVENTOR
A. H. Wright
BY
Munn & Co
ATTORNEYS.

(No Model.) 2 Sheets—Sheet 2.

A. H. WRIGHT.
FILTER.

No. 559,249. Patented Apr. 28, 1896.

WITNESSES:
C. Neveux
Theo. Hooster

INVENTOR
A. H. Wright
BY Munn & Co
ATTORNEYS.

UNITED STATES PATENT OFFICE.

ALEXANDER HISLOP WRIGHT, OF STRATFORD, CANADA.

FILTER.

SPECIFICATION forming part of Letters Patent No. 559,249, dated April 28, 1896.

Application filed September 21, 1895. Serial No. 563,225. (No model.)

*To all whom it may concern:*

Be it known that I, ALEXANDER HISLOP WRIGHT, of Stratford, in the Province of Ontario and Dominion of Canada, have invented a new and Improved Filter, of which the following is a full, clear, and exact description.

The object of the invention is to provide a new and improved filter which is simple and durable in construction, and more especially designed for filtering cane-juice and other liquids in a very economical and thorough manner.

The invention consists principally of a casing mounted on hollow trunnions forming the inlet and outlet for the liquid to be filtered, a perforated plate supported above the bottom of the casing to form a space from which leads the said outlet, and a removable cover for the said casing.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1:
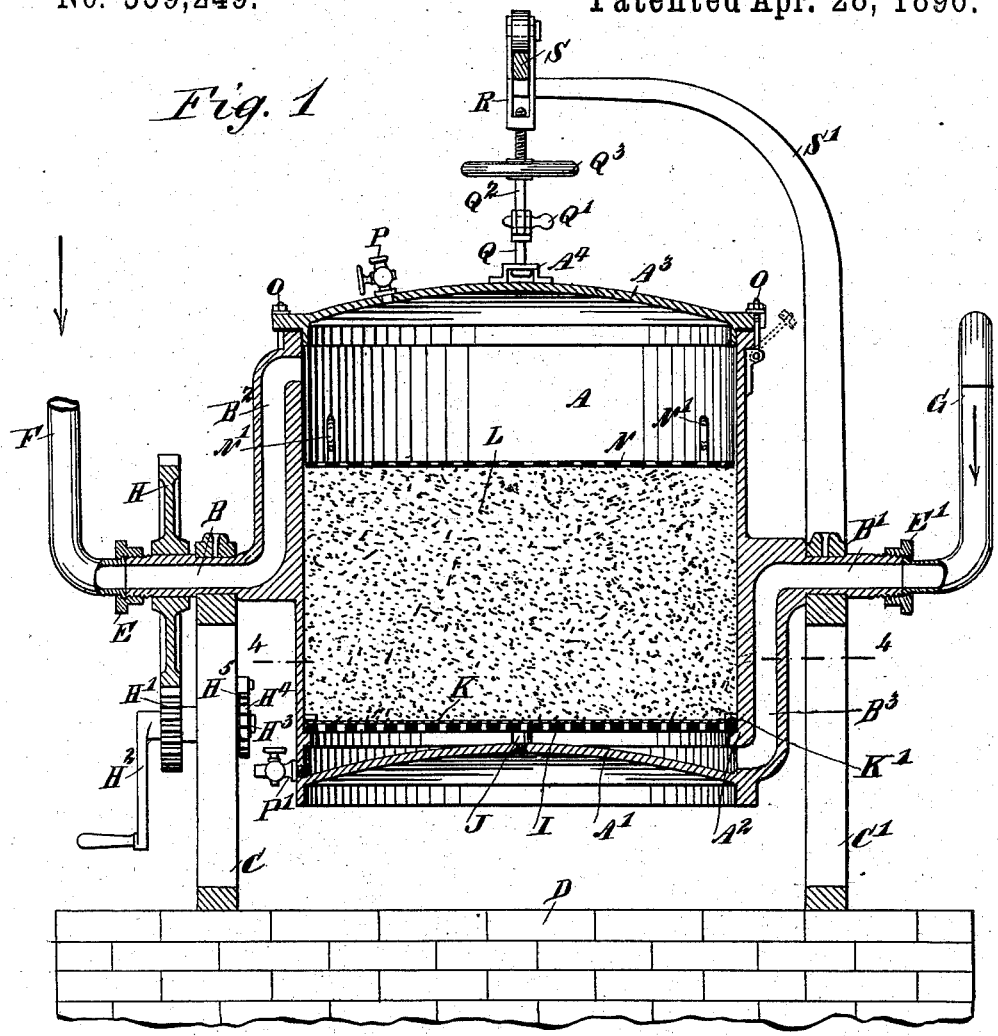
Figure 2:
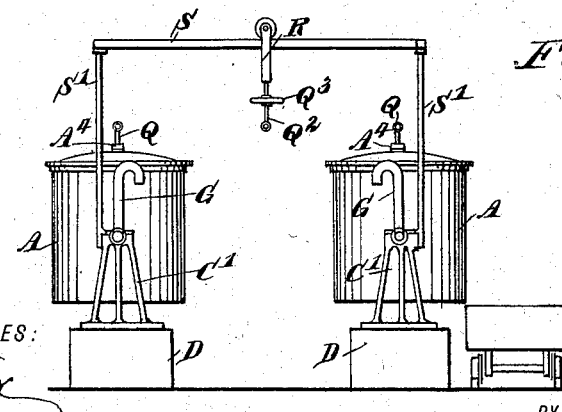
Figure 3:
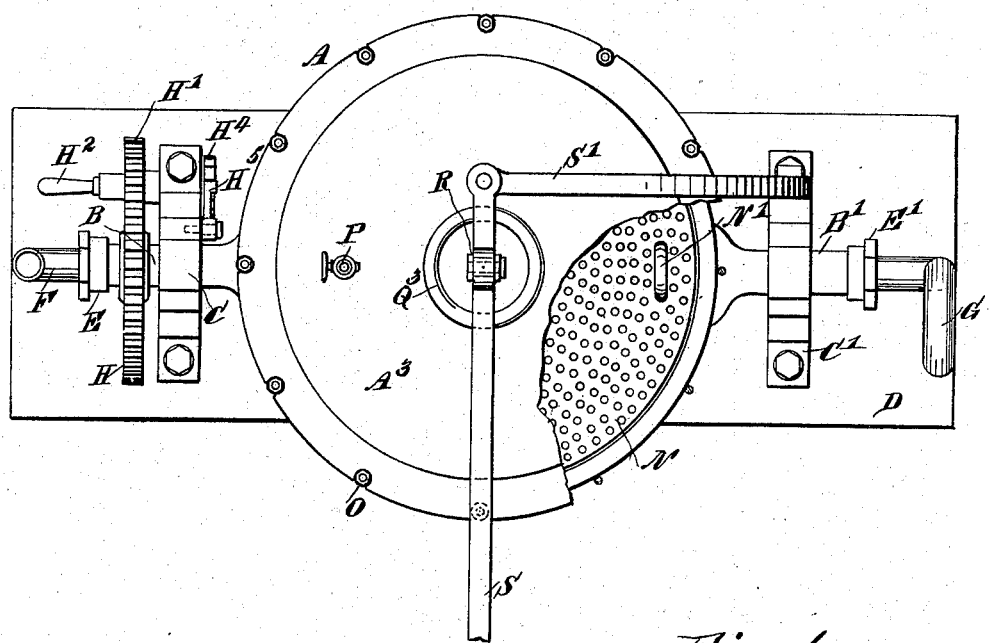
Figure 4:
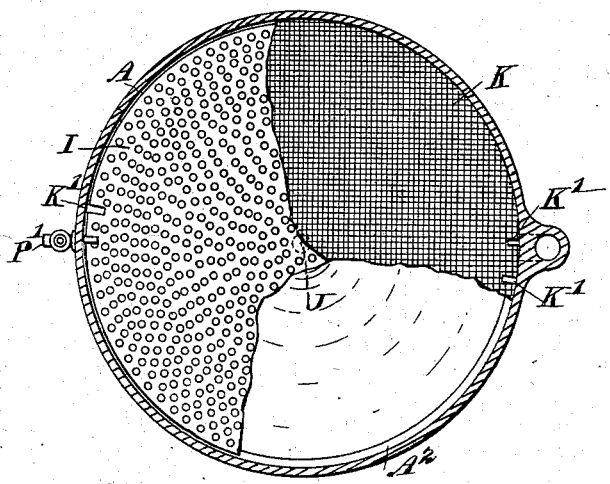

Figure 1 is a sectional side elevation of the improvement. Fig. 2 is a reduced side elevation of a pair of connected filters. Fig. 3 is a plan view of the improvement with part of the cover broken out, and Fig. 4 is a sectional plan view of the improvement on the line 4 4 of Fig. 1.

The improved filter is provided with a casing A, preferably made cylindrical, and having a fixed convex bottom A' and on its sides two hollow trunnions B and B', mounted to turn in suitable bearings held on standards C and C', respectively, attached to a suitable foundation D. The inner ends of the hollow trunnions B and B' connect with channels B² and B³, respectively, forming the inlet and outlet for the casing A, the inlet-channel B² leading to the top of the casing, while the outlet-channel B³ leads from directly above the bottom A' of the casing, as is plainly shown in Fig. 1. On the outer ends of the trunnions B and B' are held glands E and E', respectively, engaging the inlet and outlet pipes F and G, so that the trunnions B and B' can turn, while the pipes F and G remain stationary. The pipe F is connected with a suitable supply-tank containing the cane-juice or other liquid to be filtered, and located a suitable distance above the filter to cause the liquid to flow by gravitation through the filter. The other pipe, G, is curved upward to a distance corresponding to the height of the casing A, so that during the process of filtering the casing is always filled with the liquid.

On the trunnion B is secured a gear-wheel H in mesh with a pinion H', journaled on the standards C and carrying a crank-arm H² for turning the said pinion to revolve the gear-wheel H and cause a turning of the casing A in its bearings for emptying the casing of the filtering mass, as hereinafter more fully described.

A ratchet-wheel H⁴ is held on the shaft H³ of the pinion H', and this ratchet-wheel is engaged by a pawl H⁵, to lock the shaft H³, and consequently the casing A, in an inclined position to enable the operator to properly clean the casing.

A short distance above the bottom A' of the casing A is arranged a perforated plate I, supported at its edge on an annular projection A², formed on the wall of the casing, and the middle of this plate I is supported on a lug J, riveted or otherwise secured to the apex of the bottom A', as is plainly shown in Figs. 1 and 4.

On the top of this filtering-plate I is placed a sheet of canvas K, having its edges tucked under lugs K', projecting from the wall of the casing, as is plainly shown in Fig. 4. On the top of this canvas K is placed the filtering material L in the form of bagasse as it is taken from the grinding-mill, and on the the top of this filtering material L is placed a second perforated plate N, provided with handles N' for conveniently removing the said perforated plate after the filtering process is over. The canvas K prevents minutely-divided bagasse from passing through when filling the bagasse into the casing.

The cover A³ for the casing A is adapted to be fastened by hinged plates O to the casing, and in the said cover is secured an air-cock P for letting out the air when starting the apparatus. An outlet-cock P' is arranged in the lower part of the casing between the bottom A' and the plate I to draw off the liquid in the space between the bottom and plate previous to removing the filtering material. On the middle of the cover $A^3$ is secured a bearing $A^4$, in which is mounted to turn a bolt Q, adapted to be fastened by a pin Q' to the lower end of a screw-rod $Q^2$, carrying a hand-wheel $Q^3$ for conveniently turning the said screw-rod, the latter screwing in a carriage R, mounted to travel longitudinally on a rail S, supported on brackets S', attached to the standards C' of the two filtering-casings A, placed suitable distances apart, as plainly shown in Fig. 2.

By the arrangement described the carriage R with the screw-rod $Q^2$ can be run from one filter to the other to connect by the pin Q' with the respective bolt Q, so as to lift the cover $A^3$ of this filter off the casing A whenever required, it being, however, understood that the bolts O have previously been loosened and swung into a downward position. (See dotted lines in Fig. 1.)

The operation is as follows: The bagasse from the mill is brought in bags or baskets loaded on a car or wagon to the filters, and then each filter is filled with the bagasse to form the filtering material L, after which the perforated plate N is placed on top of the filtering material and the cover $A^3$ is put in position. A valve in the pipe F is now opened—say, about half-way—to permit the liquid to be filtered to flow from the pipe F through the hollow trunnion B and channel $B^2$ into the upper part of the casing A and then through the plate N and filtering material L through the plate I to finally pass into the space between the said plate I and bottom A'. The filtered liquid then flows through the channel $B^3$ in an upward direction to the hollow trunnion B' and from the latter to the outlet-pipe G to a place of discharge. The liquid flows through the filter under a pressure—say, from six to eight pounds—and when the liquid commences to flow through the pipe G then the valve in the pipe F is opened wide, and the liquid is permitted to flow through the filter for from six to eight hours before a clogging of the filter will occur. The air-cock P is opened from time to time to let out any air or steam that may accumulate in the top of the casing A. The object of extending the outlet-pipe G to the top of the casing A is to cause the impurities which float on the liquid to remain in the top of the casing A, while only the heavier impurities pass to the filtering mass L and settle before reaching the canvas K and plate I. After the filtering process is over the valve in the pipe F is closed, and the outlet-cock P' is opened to draw out the small quantity of liquid remaining in the casing A, and at the same time the air-cock P is opened to insure a ready flow of the liquid through the said cock P'. During this operation the bolts O are loosened and swung downward to unlock the cover $A^3$, and the latter is then lifted by the screw-rod $Q^2$ and moved to one side of the filter-casing by causing the carriage R to travel along the rail S with the suspended cover. The operator now takes hold of the crank-arm $H^2$ to turn the pinion H' and cause the casing A to swing on its trunnions. The plate N is then removed and the filtering mass L is dumped into a wagon. The casing is then cleaned, and, if necessary, new canvas K is put in place, and the casing is swung up to its former vertical position and refilled with the filtering mass, and the cover $A^3$ is replaced, and the above-described operation is repeated.

Instead of bagasse, straw, fiber from the maguey plant or other plants, fine gravel, and many other materials can be used. The filtering mass removed from the casing A is passed to the grinding-mill and from there to the furnace, where it is consumed as fuel.

It will be seen that by the arrangement described a disconnecting of the inlet and outlet pipes from the casing is not necessary, and the casing can be readily turned for conveniently filling and emptying the filtering mass. Thus considerable time is saved in working the apparatus, and but few men are required to attend to the filter.

Having thus fully described my invention, I claim as new and desire to secure by Letters Patent—

1. In filtering apparatus, the combination of two standards, each having a bearing, the bearings being horizontally alined, one standard being extended upwardly above its bearing and thence inwardly, a rail supported on the extended portion of the standard, a carriage moving on the rail, a filter-casing having trunnions journaled in the boxes of the standards, and a removable top for said casing, the top being capable of connection with the carriage, substantially as described.

2. In a filtering apparatus, the combination of two standards, each having a bearing and one being raised above the bearing and extended inwardly, a filtering-casing having trunnions journaled in the bearings, a rail carried by the extended portion of the standard, a carriage rolling on the rail, a threaded shaft adjustably carried by the carriage, and a removable cover for the casing, the cover being capable of connection with the shaft, substantially as described.

ALEXANDER HISLOP WRIGHT.

Witnesses:
GEORGE GORDON MILLS,
WILLIAM ROTHWELL PLOWMAN.